United States Patent [19]

Kitakami et al.

[11] Patent Number: 4,497,039

[45] Date of Patent: Jan. 29, 1985

[54] JOIN OPERATION PROCESSING SYSTEM IN RELATIONAL MODEL

[75] Inventors: Hazime Kitakami, Yokohama; Hiroshi Ishikawa, Tokyo; Masayoshi Tezuka; Susumu Adachi, both of Kawasaki; Akifumi Makinouchi, Yokohama, all of Japan

[73] Assignee: Fujitsu Limited, Kawasaki, Japan

[21] Appl. No.: 393,558

[22] Filed: Jun. 30, 1982

[30] Foreign Application Priority Data

Jun. 30, 1981 [JP] Japan .................... 56-101490

[51] Int. Cl.³ ............................ G06F 15/20
[52] U.S. Cl. .................... 364/900; 364/300
[58] Field of Search ... 364/200 MS File, 900 MS File, 364/300

[56] References Cited

U.S. PATENT DOCUMENTS 3,997,880 12/1976 Chen et al. ............ 364/900
4,037,205 7/1977 Edelberg et al. ........ 364/900
4,128,891 12/1978 Lin et al. ............... 364/900
4,283,771 8/1981 Chang .................... 364/900
4,422,145 12/1983 Sacco et al. ............ 364/300

Primary Examiner—Raulfe B. Zache
Attorney, Agent, or Firm—Staas & Halsey

[57] ABSTRACT

The present invention discloses a join operation processing system in a relational model where a data base processing mechanism provides at least maximum/minimum calculation execution means, reduction sort execution means and the join operation execution means.

During the join operation for generating a new table linking tuples of a plurality of pertinent tables based on a common field or plurality of common fields, a minimum extraction range for determining the tuples to be processed is determined with respect to the join field or the plurality of join fields for each table which is considered as the object of the join. The operation rate is thereby improved by omitting the processing referring to unwanted data.

6 Claims, 8 Drawing Figures

JOIN OPERATION PROCESSING SYSTEM IN RELATIONAL MODEL

BACKGROUND OF THE INVENTION

1. Field of the Invention

The present invention relates to a join operation processing system in a relational model, particularly to a join operation processing system in the relational model where, on the occasion of the join operation which generates a new table linking the tuples or sets of related information of a plurality of pertinent tables focusing on the common field between the tables or a plurality of common fields between tables having a plurality of fields, the minimum extraction range for determining the tuples to be processed is determined in regard to the join field or the plurality of join fields for each table which is considered as the object of the join operation and thereby, the operation rate of the system is improved by omitting, as far as possible, the processings which refer to unwanted data.

2. Description of the Prior Art

In the data processing system utilizing a data base, each set of data is often held as table such as shown in FIGS. 1(A), (B).

In FIG. 1, 1 indicates, for example, an employee A table (EMPA) listing information relating to employees. The employee A table 1 provides or comprises, for example, the fields 2-1 to 2-4 for employee number (ENO), employee name (NAME), department number (DNO) and salary (SAL), respectively. In the employee A table 1, for example, "70101, Yamada, 005, $a_1$" are respectively together called a tuple and table 1 provides tuples 3-1, 3-2, . . . .

In FIG. 1, 4 indicates a department A table (DEPTA) which is one of several possible tables relating to department. The department A table 4 provides or comprises, for example, the fields 5-1 to 5-3 for the department number (DNO), department name (DNAME) and location (LOC), respectively, and also provides plurality of tuples 6-1, 6-2, . . . .

The tuples in the employee A table 1 and the department A table 4 are often or usually not sorted in an ascending sequence or descending sequence with respect to the field which is going to be join processed or related by another table, for example the department number (DNO) fields 2-3 and 5-1 of table 1 and table 4 are not in any particular logical order. Of course, it is natural that a sorted relationship between tuples is the most desirable for execution of the join processing operation in order to minimize searching and the present invention uses such sorted results.

In general, although not sorted differently from above random condition, certain kinds of table, among those indicated, have an index 7 or index table for the field used with a high frequency as shown in FIG. 1(C).

Namely, the index table 7 indicated in FIG. 1(C), in the example, is an index prepared for the department field (DNO) 2-3 in the employee A table 1 in order of department number. The index of this kind has information pairs of 8-1, 8-2, . . . and each information pair provides, in the case of FIG. 1(C), a department number (DNO) and a tuple indentifier, for example, the addresses $*_1, *_2, \ldots$ of where the tuple with the pertinent department number exists in the employee A table 1. In the pertinent index table, as shown in FIG. 1(C), the department number (DNO) is held, for example, in an ascending order and if the desired department number (DNO) i is designated, it is possible to directly extract the corresponding address information pair 8-i from the index table 7. Existence of such an index 7 is equivalent to having a part of the department field (DNO) 2-3 in the employee A table 1 sorted and the present invention also uses an index of this kind.

The join processing in the present invention may be thought of as corresponding to the generation of a table having a new tuple, for example, by linking equivalent tuples, that is, tuples having a department number (DNO) in the employee A table 1 with the tuple having the department number (DNO) in the department A table 4.

When performing the join processing operation, for example, it is determined whether the department number "020" corresponding to the department number "020" in the department A table 4 exists in the employee A table 1 by using the sorted table or index as explained above. When such department number exists, the tuples, for example 6-3, 3-2 having the department number "020" of both tables are linked. For the above-mentioned join processing, it is very effective to utilize the sorted table or index as explained above, but, for example, when the user desires that the department numbers (DNO) having a value "10" to "30" should be joined, join processing is only required for tuples within the range of pertinent values and the processing speed is still unduly limited if processing is not carried out by limiting the tuples considered as an object of the join processing operation.

Presently the following processing systems are used within the join processing field.

(A) A system for obtaining an answer by sequentially scanning an index which exists for the join of fields of pertinent tables.

(B) A system for obtaining an answer by sorting each tuple based on the join field when the index does not exist and by scanning the sorted result.

(C) A system which combines systems (A) and (B)

(D) A system for obtaining an answer satisfying the join predicate by executing a Cartesian operation for each relation.

But as explained above, it is still probable that reference to unwanted data will still occur, resulting in an undue limitation in the operation speed.

SUMMARY OF THE INVENTION

It is an object of the present invention to solve the above-mentioned problem and moreover to realize high speed join processing by limiting joined tuples to a minimum range.

In order to attain such an object, the join operation processing system in a relational model relates to a data processing system where a data base storing a plurality of tables having plurality of fields respectively is provided. A pertinent index table is held in such a manner that one or a plurality of fields in the index table are arranged in accordance with an ascending or descending sequence and corresponding fields point to one or a plurality joinable tuples in the tables, and processings are executed by providing a data base processing mechanism and using the tables on the data base.

The data base processing mechanism provides at least maximum/minimum calculation execution means having a function which preliminarily judges the tuple extraction range for the join field in the join object table based on a join predicate described by users and dictionary information for the index which can be utilized for said join processing, reduction sort execution means which sorts one of the unsorted tables or one of the tables which cannot use the index based on the preliminarily judged extraction range mentioned above and executes the sorting for the next table based on the extraction range limited by said sorting, and join calculation execution means which executes the join processing by extracting the join object tuples for the join object table based on the extraction range determined for the pertinent index table for the table which can use the index and the extraction range of table sorted by said reduction sort execution means; whereby the processing instructed by users is executed on the basis of limited tuples of the join object table.

DESCRIPTION OF THE PREFERRED EMBODIMENTS

Embodiments of the present invention are explained in detail with reference to the attached drawings.

Figure 1:
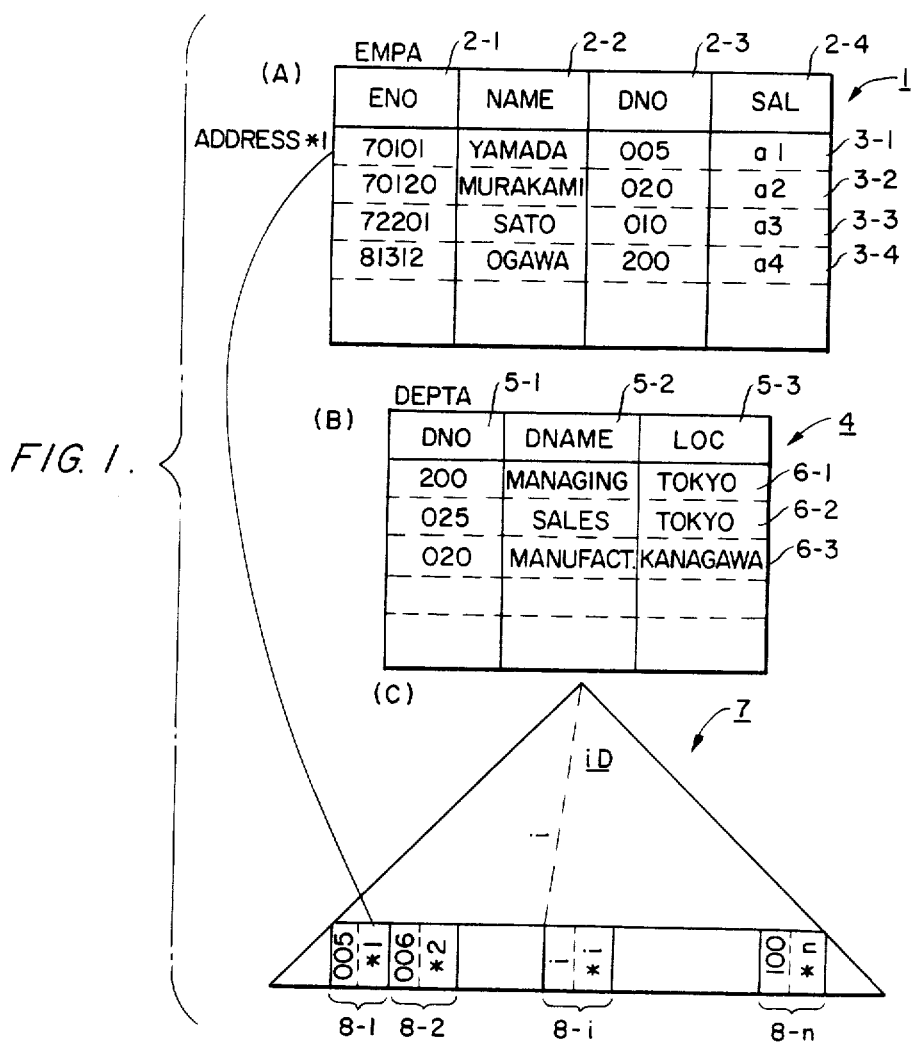
FIG. 1 explains the concepts of table, field, tuple and index in the present invention.
Figure 2:
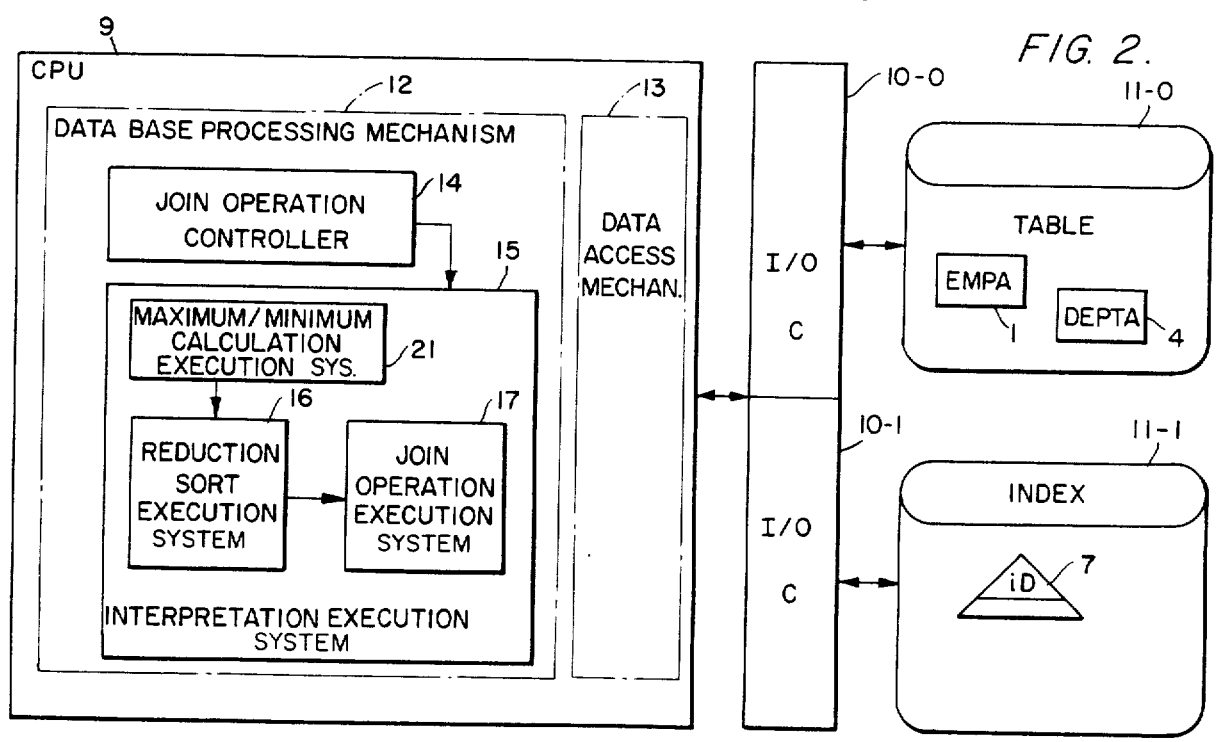
FIG. 2 is the structure of an embodiment of the present invention.

In the embodiment shown in FIG. 2, numerals 1, 4 and 7 correspond to those in FIG. 1. 9 is a data processing system, 10 is an input/output control system, 11-0 is a table memory, 11-1 is the index memory, 12 is the data base processing mechanism, 13 is a data access mechanism, 14 is a join operation controller, 15 is an interpretation execution system, 16 is a reduction sort execution system, 17 is a join operation execution system, and 21 is a maximum/minimum calculation execution system.

The data processing system 9 includes the program modules to be executed by the data base processing mechanism 12 within corresponding local memory and executes the functions of data base processing mechanism 12 by executing the pertinent program system module. This data processing system 9 executes the desired processings by fetching the data, as required, from the table memory 11-0 and index memory 11-1 into the local memory and stores the data as required within each memory 11-0 or 11-1.

The data base processing mechanism 12 includes at least the join operation controller 14 and interpretation execution system 15. The join operation controller 14 executes processings such as indentifing the type of join predicates described by users, the determination of the join processing sequence and the selection of access path etc. and and additionally controls the processings of the interpretation execution system 15. Moreover, the interpretation execution system 15 comprises the reduction sort execution system 16, join operation execution system 17 and the maximum/minimum calculation execution system 21 and has a function of interpreting the instructions issued by users and of executing the corresponding processings. The maximum/minimum calculation execution system module 21 provides the function of preliminarily judging the tuple extraction range for the join object table, as explained later by referring to FIG. 3, from the join predicate described by the user given for the join processing and the dictionary information for the index to be used.

The reduction sort execution system module 16 executes, as explained later by referring to FIG. 3, the sort for the unsorted tables and those other tables which cannot use the index while limiting the extraction range of relations required for the join processing. Moreover, the join operation execution system module 17 uses the sorted tables and index, extracts the tuples within extraction range in the finally limited form and executes the join processing instructed by users.

Figure 3:
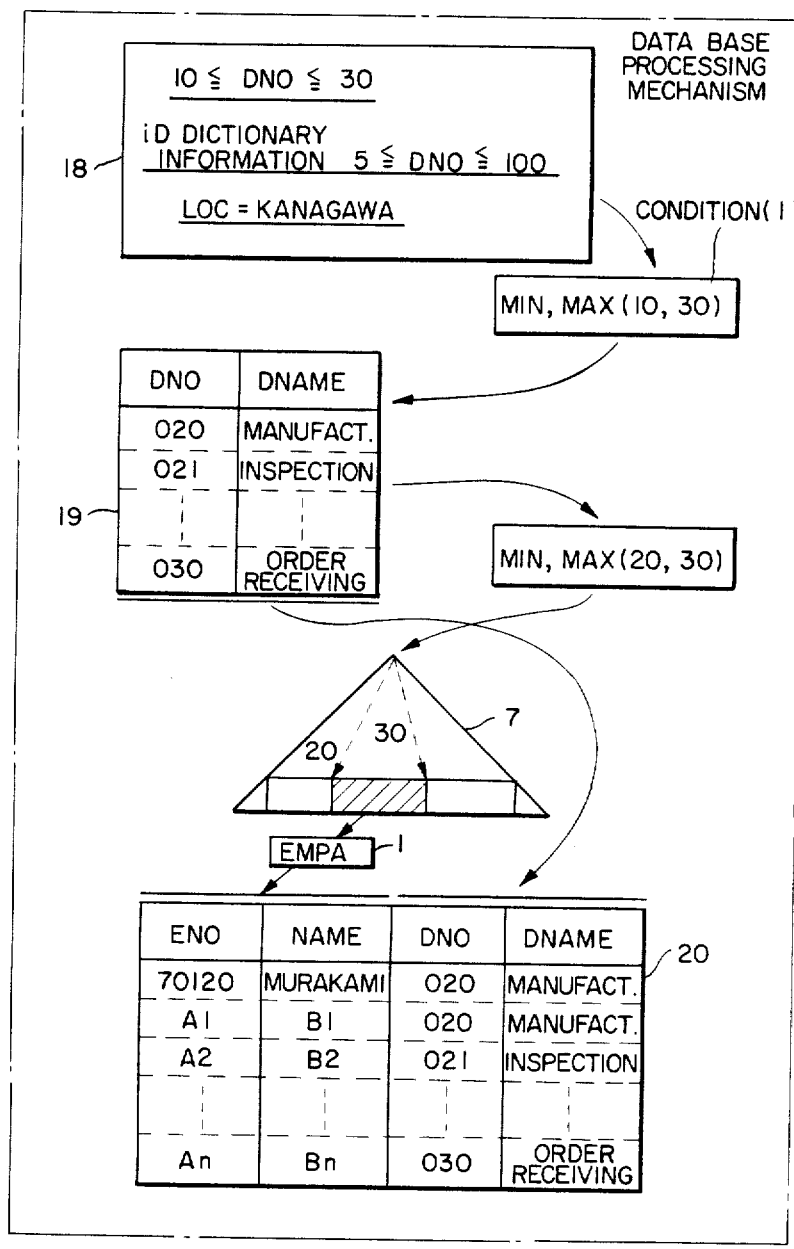
FIG. 3 indicates the processing performed by the data base processing mechanism shown in FIG. 2.

FIG. 3 shows an embodiment indicating the processings in the data base processing mechanism of FIG. 2.

Here it is supposed that following instructions are given, for example, by the user in the situation that the tables, 1, 4 and index 7 as shown in FIG. 1 exist.

GET ENO, NAME, DEPTA. DNO, DNAME
FROM EMPA, DETPA
WHERE EMPA. DNO=DEPTA. DNO
AND 10=DEPTA. DNO=30
AND LOC='KANAGAWA';

These instructions require the generation of a join object table, having new tuples each including the employee number (ENO), employee name (NAME), department number (DNO) and department name (DNAME) with respect to a department which is located at Kanagawa Prefecture and has department numbers (DNO) ranging from "10" to "30", by utilizing the table (EMPA) 1 and the table (DEPTA) 4 with the department numbers (DNO) of both tables used as the join field. The conditions enclosed by the dotted line correspond to the join predicate.

When an index table 7 as shown in FIG. 1(C) exists, a range of $5 \leq DNO \leq 100$ is available with regard to the index dictionary information. The maximum/minimum calculation execution system module 21 receives the information 18 shown in FIG. 3 from the join predicate and index dictionary information. It also determines that there is an index table 7 having a range including the conditions of $10 \leq DNO \leq 30$ in the join predicate in the employee A table (EMPA) 1 and also determines that no sorting is carried out for the department number (DNO) in the department A table (DEPTA) 4. It moreover detects that LOC='Kanagawa' is the condition for sorting of the department A table (DEPTA) 4.

As a result, the maximum/minimum calculation execution system module 21 sends instructions indicating that the tuples which are the sort object for the table 4 have the following condition (1) to the reduction sort execution system module 16 for performing the necessary sorting.

$10 \leq DNO \leq 30$ and

LOC = Kanagawa        (1)

The reduction sort execution system module 16 carries out the necessary sorting, for example, like the sorted result 19 shown in the FIG. 3 for the tuples having the above condition (1) in the table 4. When the department number (DNO) is in the range from the minimum number of "20" to the maximum number of "30" in this sorted result 19, above-mentioned condition $$10 \leq DNO \leq 30 \quad (2)$$

is further converged to $$20 \leq DNO \leq 30 \quad (3)$$

In addition, if there is an unsorted table, the sorting is carried out with respect to condition (3) for the pertinent unsorted table. In the case of the above example, the index table 7 can be used for the table 1 and therefore the join operation execution system module 17 is instructed to execute the join processing from both table 1 and table 4 based on the above-mentioned condition (3) after the end of sort processing.

The join execution system module 17 extracts the desired tuple from the table 1 using the address from index table 7 corresponding to the table (EMPA) 1 and meanwhile generates the join object table 20 shown in FIG. 3 by using the sorted information 19 from the table (DEPTA) 4. Namely, it generates a new table 20, the join object table, including the tuples having the employee number (ENO), employee name (ENANE), department number (DNO) and department name (DNAME).

Figure 4:
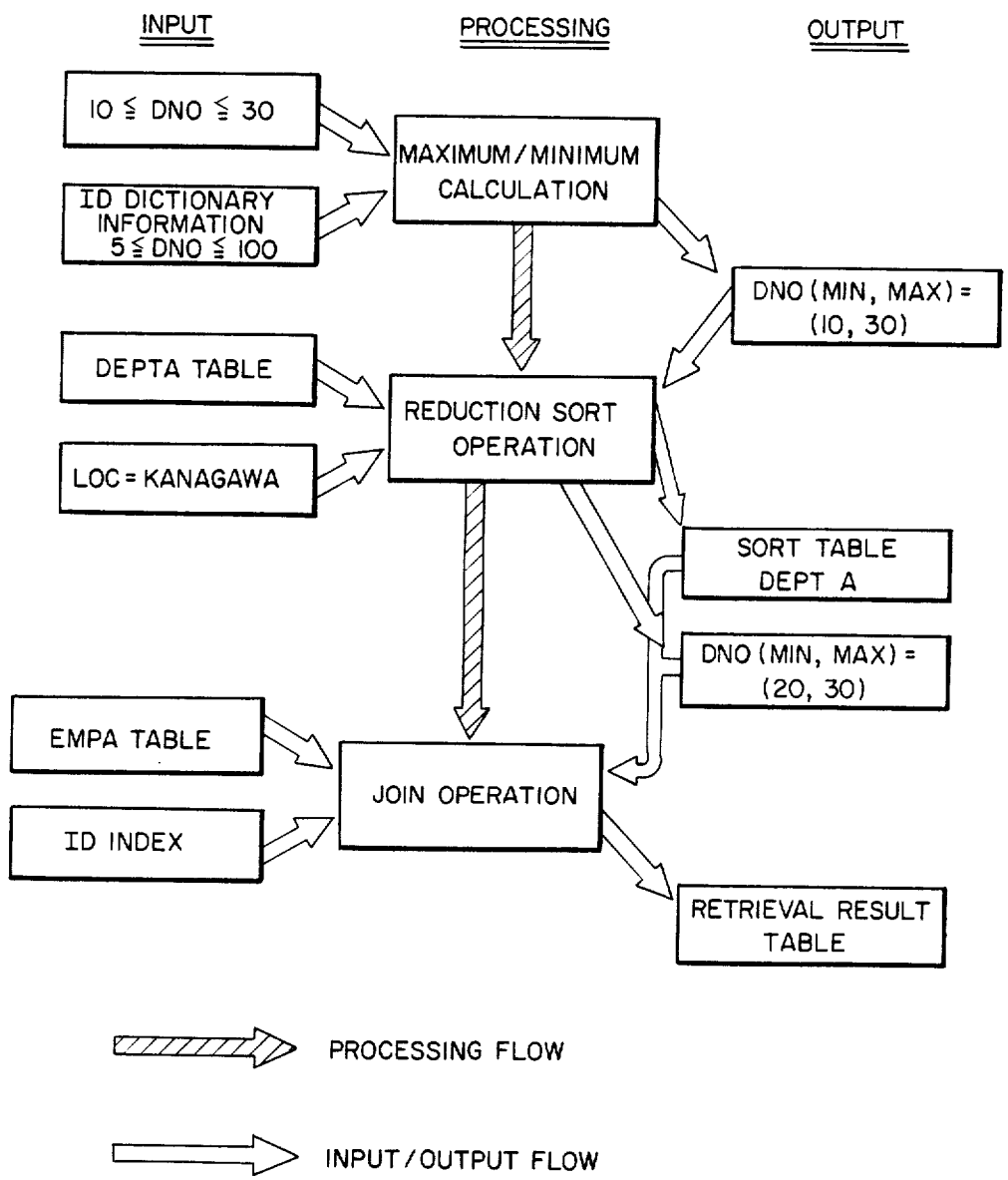
FIG. 4 shows the flow of processing for FIG. 3.

FIG. 4 shows the embodiment of FIG. 3 as a flow of processing.

During the maximum/minimum calculation processing, the conditions, [$10 \leq DNO \leq 30$] and [ID dictionary information $5 \leq DNO \leq 100$] are input and [DNO(min, max)=(10, 30)] is output.

During the reduction sort operation processing, conditions [DEPTA table] and [LOC=Kanagawa] are input, and [sort table DEPTA], [DNO(min, max)=(20, 30)] are output.

During the join operation processing, conditions [EMPA table], [ID index], [sort table DEPTA'] and [DNO(min, max)=(20, 30)] are input and [retrieval result table] is output.

Figure 5:
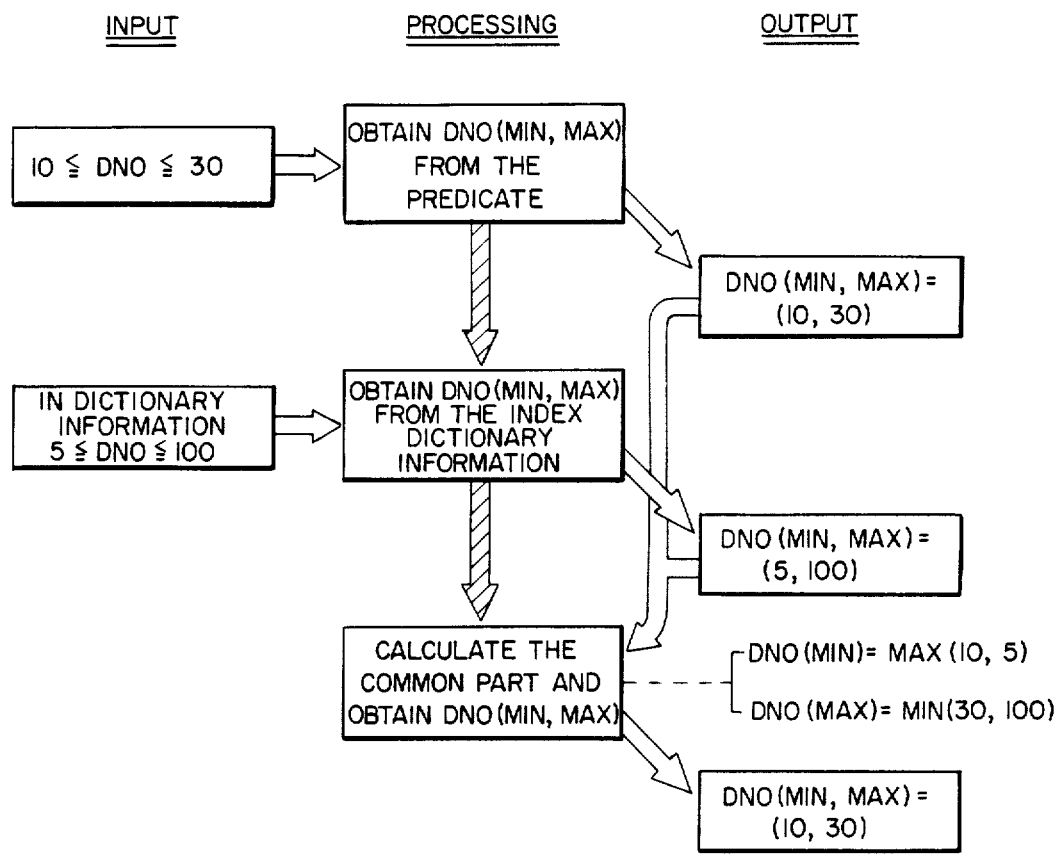
FIG. 5 to FIG. 7 show detailed processing flows of the data base processing mechanism shown in FIG. 2 for the embodiment of FIG. 3.

FIG. 5 shows the detailed processing flow of the maximum/minimum calculation execution system module 21 (shown in FIG. 2) in the embodiment of FIG. 3.

Figure 6:
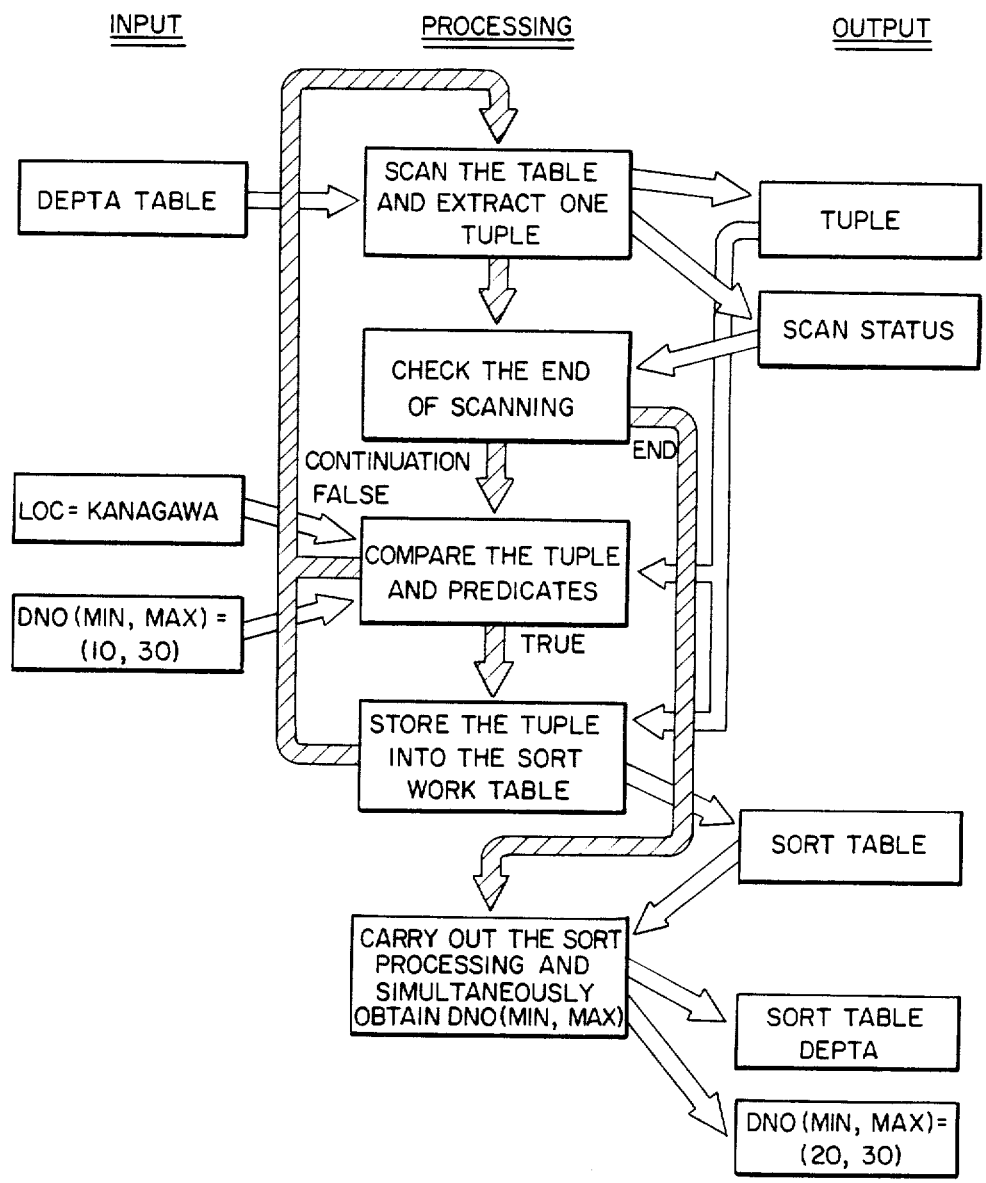

FIG. 6 shows detailed processing flow of the reduction sort execution system module 16 (shown in FIG. 2) in the embodiment of FIG. 3.

Figure 7B:
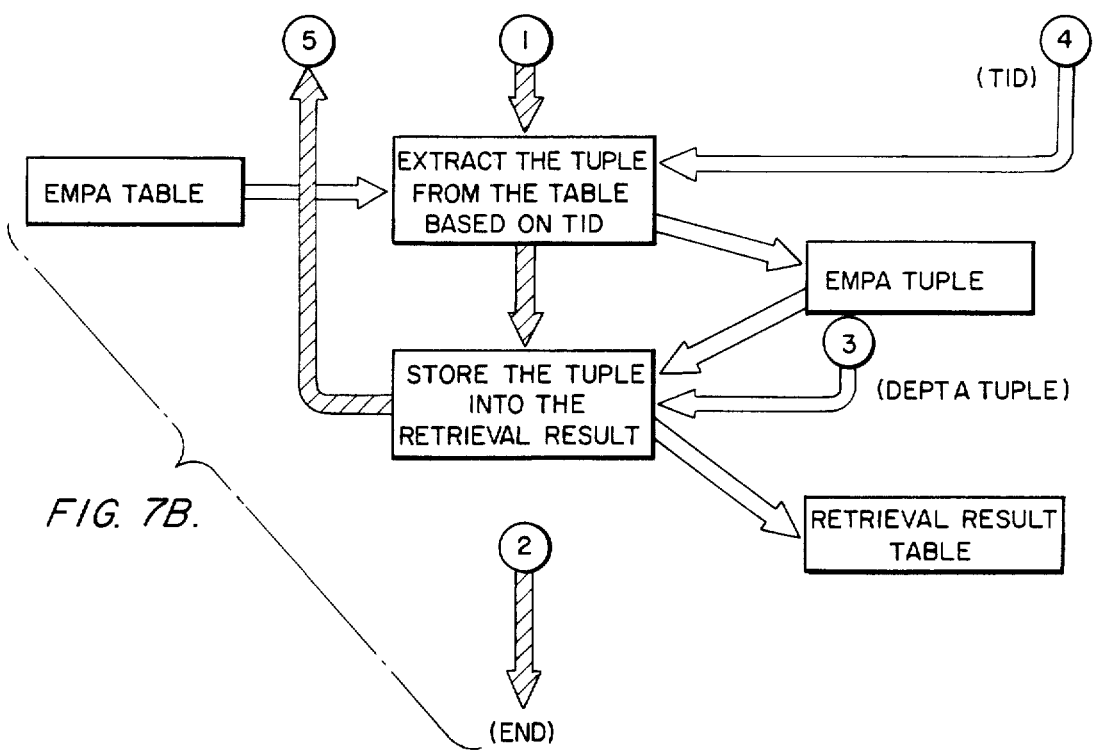
Figure 7A:
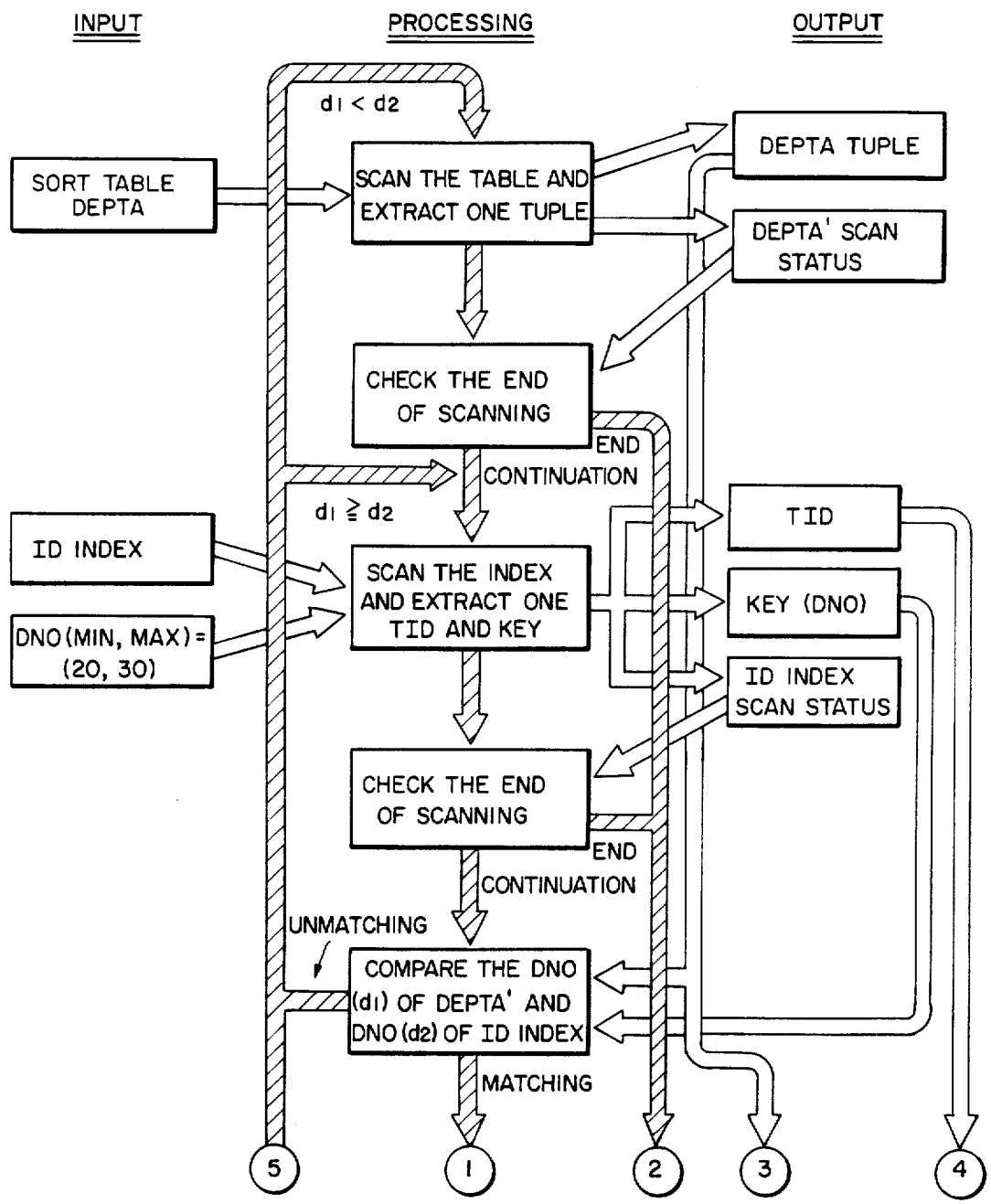

FIG. 7 shows the detailed processing flow of the join operation execution system module 17 (shown in FIG. 2) in the embodiment of FIG. 3.

The user processing can, thus, be focused only on the minimum data obtained by the above-mentioned processing and the time required for join processing can be drastically curtailed.

Explained above is the so-called field join where a join is carried out focusing on one field (DNO in the case of figure) in the respective tables, but it goes without saying that the present invention can be applied to a so-called tuple join where the join is carried out for the combination of a plurality of fields.

The above join processing can also be used for a high speed correlation operation such as GET DNO, DNAME
FROM 10 COUNT (ENO FROM EMPA WHERE
DNO=D. DNO) (correlation)

instructing, for example, "Find the department names (DNAME) where the number of employees is 10 persons or less using the DEPTA and EMPA."

Moreover, for example, the join processing can also be applied to the execution where the membership relation predicate is converted to the correlation predicate in a case where an instruction is given such as, "Obtain the names and salaries of persons in the departments in Kanagawa Prefecture having 70000 employees or less." (A detailed explanation is omitted since the operation has been previously explained for a more complicated predicate.) In addition, although a detailed explanation is also omitted, this join processing method can be applied to the operation of obtaining the intersection set in the set theory.

As explained above, the present invention realizes the join processing operation only by extracting the minimum data and, therefore, beneficially reduces the reference to unwanted data, thus drastically improving processing speed.

While the present invention has been described with respect to a specific embodiment thereof, it is to be understood that the present invention is not limited thereto in any way but covers any and all changes and modifications which will become possible within the scope of the appended claims.

We claim:

1. A join operation processing system responsive to user instructions for performing join operations in a relational model in a data processing system where a data base storing a plurality of data tables, each data table comprising a plurality of information fields with a plurality of data entries within each field, further storing pertinent index tables arranged such that entries in each index table are in an ascending or descending sequence, the entries in the index table corresponding to the data entries in an information field in one or plurality of said data tables and storing dictionary information for each table defining the information fields, and processings are executed by providing a data base processing mechanism and using said tables of said data base, said data base processing mechanism at least comprising:

maximum/minimum calculation execution means for preliminarily judging a tuple extraction range for a join field in a join object table based on a join predicate described by users and the dictionary information for the index table which can be utilized for said join processing;

reduction sort execution means for sorting one of unsorted tables or one of the tables which cannot use the index tables based on the preliminary judged tuple extraction range and for executing the sorting for a succeeding table based on the extraction range limited by the sorting by said reduction sort execution means; and join calculation execution means for executing join processing by extracting the join object tuple for the join object table based on the extraction range for the index table for the table which can use the index and the extraction range of the table sorted by said reduction sort execution means, whereby the processing instructed by users is executed on the basis of the limited relationship defined by the join object table.

2. A method of join operation processing for first and second tables using a processing unit and a memory and responsive to user instructions where the user specifies a desired range and where an index table and index table range are provided for the second table, comprising the steps of:

(a) determining an extraction range for tuple extractions, comprising the steps of:
   (i) inputting the desired range;
   (ii) inputting the index table range; and
   (iii) determining, as the extraction range, a common range between the index table range and the desired range;
(b) performing a reduction sort on the first table using the determined extraction range; and
(c) performing a join operation based on the reduction sorted table with the second table.

3. A method of join operation processing as recited in claim 2,
   wherein step (i) comprises inputting minimum and maximum values of the desired range,
   wherein step (ii) further comprises obtaining a minimum and maximum value from the index table range, and
   wherein step (iii) comprises the steps of:
   (I) selecting as a minimum of the common range the greater of the minimum value of the desired range and the minimum value of the index table range; and
   (II) selecting as a maximum of the common range the lesser of the maximum value of the desired range and the maximum value of the index table range.

4. A method of join operation processing as recited in claim 2, wherein step (b) comprises the steps of:
   (i) scanning the first table for tuples within the extraction range;
   (ii) sorting the tuples within the extraction range to produce the reduction sorted table; and
   (iii) determining a range of the sorted tuples and substituting it for the extraction range.

5. A method of join operation processing as recited in claim 4, wherein step (i) comprises the steps of:
   (I) scanning the first table and extracting a tuple;
   (II) determining if the end of the first table has been reached;
   (III) comparing the extracted tuple with the extraction range if the end of the first table has not been reached; and
   (IV) storing the tuple in a work sort table if the tuple is within the extraction range.

6. A method of join operation processing as recited in claim 2,
   wherein each tuple has a key, and
   wherein step (c) comprises the steps of:
   (i) scanning the reduction stored table and extracting a tuple;
   (ii) scanning the index table for a match with the tuple key; and
   (iii) retrieving, if there is a match, the corresponding tuple from the second table and combining the tuple from the reduction sorted table with the tuple from the second table and producing a retrieval result table.

* * * * *

UNITED STATES PATENT AND TRADEMARK OFFICE
CERTIFICATE OF CORRECTION

PATENT NO. : 4,497,039
DATED : January 29, 1985
INVENTOR(S) : Kitakami et al.

It is certified that error appears in the above-identified patent and that said Letters Patent is hereby corrected as shown below:

On the title page;

[57] ABSTRACT, lines 6 and 7 should be merged into one line.

Col.3, line 36, "the" (first occurrence), should be --an--;
line 36, "the" (second occurrence), should be --a--.

Col. 4, line 19, "GET" should be --GET--;
line 20, "FROM" should be --FROM--;
line 21, "WHERE" should be --WHERE--;
line 22, "AND" should be --AND--;
line 23, "AND" should be --AND--.

Col. 5, line 23, "(ENANE)" should be --(ENAME)--;
line 43, after "shows" insert --the--;
line 62, "GET" should be --GET--;
line 63, "FROM" should be --FROM--.

Signed and Sealed this

Twentieth Day of August 1985

[SEAL]

Attest:

DONALD J. QUIGG

Attesting Officer   Acting Commissioner of Patents and Trademarks